(12) United States Patent
Izumiya (10) Patent No.: US 6,965,596 B1
(45) Date of Patent: Nov. 15, 2005

(54) μ-LAW-TO-A-LAW TRANSLATING EQUIPMENT AND A-LAW-TO-μ-LAW TRANSLATING EQUIPMENT

(75) Inventor: Minoru Izumiya, Miyagi (JP)

(73) Assignee: NEC Corporation, Tokyo (JP)

( * ) Notice: Subject to any disclaimer, the term of this patent is extended or adjusted under 35 U.S.C. 154(b) by 863 days.

(21) Appl. No.: 09/717,403

(22) Filed: Nov. 22, 2000

(30) Foreign Application Priority Data

Nov. 25, 1999 (JP) ................................. 11-334615

(51) Int. Cl.[7] ........................................... H04L 12/50
(52) U.S. Cl. ..................................... 370/358; 370/535
(58) Field of Search .............................. 370/357–359, 370/365, 360, 375, 466, 465, 535, 372

(56) References Cited

U.S. PATENT DOCUMENTS

| | | | | |
|---|---|---|---|---|
| 4,535,451 A | * | 8/1985 | Drupsteen ................... | 370/470 |
| 4,595,907 A | * | 6/1986 | Huffman et al. .............. | 341/61 |
| 5,060,227 A | * | 10/1991 | Finley et al. ............... | 370/466 |
| 6,240,179 B1 | * | 5/2001 | Balatoni et al. ........ | 379/399.02 |
| 6,553,026 B1 | * | 4/2003 | Aihara ........................ | 370/358 |
| 6,747,988 B1 | * | 6/2004 | Jordan et al. ................ | 370/466 |

FOREIGN PATENT DOCUMENTS

| | | |
|---|---|---|
| JP | 50-3204 | 1/1975 |
| JP | 61-1194 | 1/1986 |
| JP | 3-50997 | 3/1991 |

OTHER PUBLICATIONS

Japanese Office Action dated Mar. 23, 2004 with English translation of pertinent portions.

* cited by examiner

*Primary Examiner*—John Pezzlo
*Assistant Examiner*—Donald L Mills
(74) *Attorney, Agent, or Firm*—Whitham, Curtis & Christofferson, PC (57) ABSTRACT

μ-law-to-A-law translating equipment is used for plural PCM telephone lines installed between countries different in a conversion law. This translating equipment is provided with plural μ-law signal receiving circuits, a multiplexer, a μ-law-to-A-law converter, a demultiplexer, plural A-law signal output circuits and a timing pulse generator. Each μ-law signal receiving circuit outputs parallel μ-law PCM signals synchronized with a reference frame pulse and the multiplexer time-division multiplexes these signals according to a time division system. The μ-law-to-A-law converter outputs a time-division multiplexed A-law PCM signal, the demultiplexer demultiplexes this time-division multiplexed signal and outputs plural parallel A-law PCM signals. The A-law signal output circuit outputs a serial A-law PCM signal to which a frame bit is added.

10 Claims, 6 Drawing Sheets

μ-LAW-TO-A-LAW TRANSLATING EQUIPMENT AND A-LAW-TO-μ-LAW TRANSLATING EQUIPMENT

BACKGROUND OF THE INVENTION

1. Field of the Invention

The present invention relates to μ-law and A-law which are respectively an international standard for PCM digital transmission of telephonic speech, particularly relates to μ-law-to-A-law translating equipment and A-law-to-μ-law translating equipment.

2. Description of the Related Prior Art

For a PCM telephone line, there are a line encoded according to μ-law and a line encoded according to A-law based upon ITU-T Rec. G. 711. μ-law is used in Japan and North America and A-law is used in European countries. Therefore, in case an international PCM telephone line is laid between two countries different in a conversion law, a PCM speech signal is required to be converted to a different conversion law in a connection between communication networks of both countries. For this conversion, a μ-law-to-A-law converter and an A-law-to-μ-law converter are used. For example, a μ-law-to-A-law converter or an A-law-to-μ-law converter is provided every line to a primary PCM telephone line of 1.544 Mbits/s or 2.048 Mbits/s. In case the number of lines is increased, these converters are required to be also increased by the same number as the number of lines. However, when the μ-law-to-A-law converter or the A-law-to-μ-law converter is increased, the cost is increased and the reliability is deteriorated.

SUMMARY OF THE INVENTION

Therefore, the object of the invention is to provide a μ-law-to-A-law converter and an A-law-to-μ-law converter respectively not required to be increased even if PCM telephone lines between two countries different in a conversion law are increased.

To achieve the object of the invention, μ-law-to-A-law translating equipment is provided with a timing pulse generator that generates a reference frame pulse, a μ-law signal receiving circuit that receives a μ-law PCM signal and outputs parallel μ-law PCM signals according to a reference frame pulse, a multiplexer that time-division multiplexes plural parallel μ-law PCM signals and outputs a time-division multiplexed μ-law PCM signal, a μ-law-to-A-law converter that converts the time-division multiplexed μ-law PCM signal to a time-division multiplexed A-law PCM signal, a demultiplexer that demultiplexes the time-division multiplexed A-law PCM signal and outputs plural parallel A-law PCM signals and an A-law signal output circuit that receives the parallel A-law PCM signals and outputs a serial A-law PCM signal.

Also, A-law-to-μ-law translating equipment is provided with a timing pulse generator that generates a reference frame pulse, an A-law signal receiving circuit that receives an A-law PCM signal and outputs parallel A-law PCM signals according to a reference frame pulse, a multiplexer that time-division multiplexes plural parallel A-law PCM signals and outputs a time-division multiplexed A-law PCM signal, an A-law-to-μ-law converter that converts the time-division multiplexed A-law PCM signal to a time-division multiplexed μ-law PCM signal, a demultiplexer that demultiplexes the time-division multiplexed μ-law PCM signal and outputs plural parallel μ-law PCM signals and a μ-law signal output circuit that receives the parallel μ-law PCM signals and outputs a serial μ-law PCM signal.

In an embodiment of the invention, the μ-law signal receiving circuit is provided with a line receiver that converts a μ-law PCM signal from bipolar to unipolar and outputs a unipolar μ-law signal, a frame buffer that temporarily stores the unipolar μ-law signal, a frame detector that detects the frame leading part of the unipolar μ-law signal and generates an address reset pulse synchronized with the frame leading position for writing to the frame buffer, a frame position comparator that measures the time lag in a position of a reference frame pulse and the address reset pulse for writing to the frame buffer and generates an address reset pulse for reading from the frame buffer and a serial-parallel converter that converts a serial μ-law PCM signal read from the frame buffer to parallel μ-law PCM signals. Also, the A-law signal receiving circuit is provided with a line receiver that converts an A-law PCM signal from bipolar to unipolar and outputs a unipolar A-law signal, a frame buffer that temporarily stores the unipolar A-law signal, a frame detector that detects the frame leading part of the unipolar A-law signal and generates an address reset pulse synchronized with the frame leading position for writing to the frame buffer, a frame position comparator that measures the time lag in a position of a reference frame pulse and the address reset pulse for writing to the frame buffer and generates an address reset pulse for reading from the frame buffer and a serial-parallel converter that converts a serial A-law PCM signal read from the frame buffer to parallel A-law PCM signals. The μ-law-to-A-law converter and the A-law-to-μ-law converter can correspond by adding a receiving circuit and a transmitting circuit even if telephone lines are increased.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
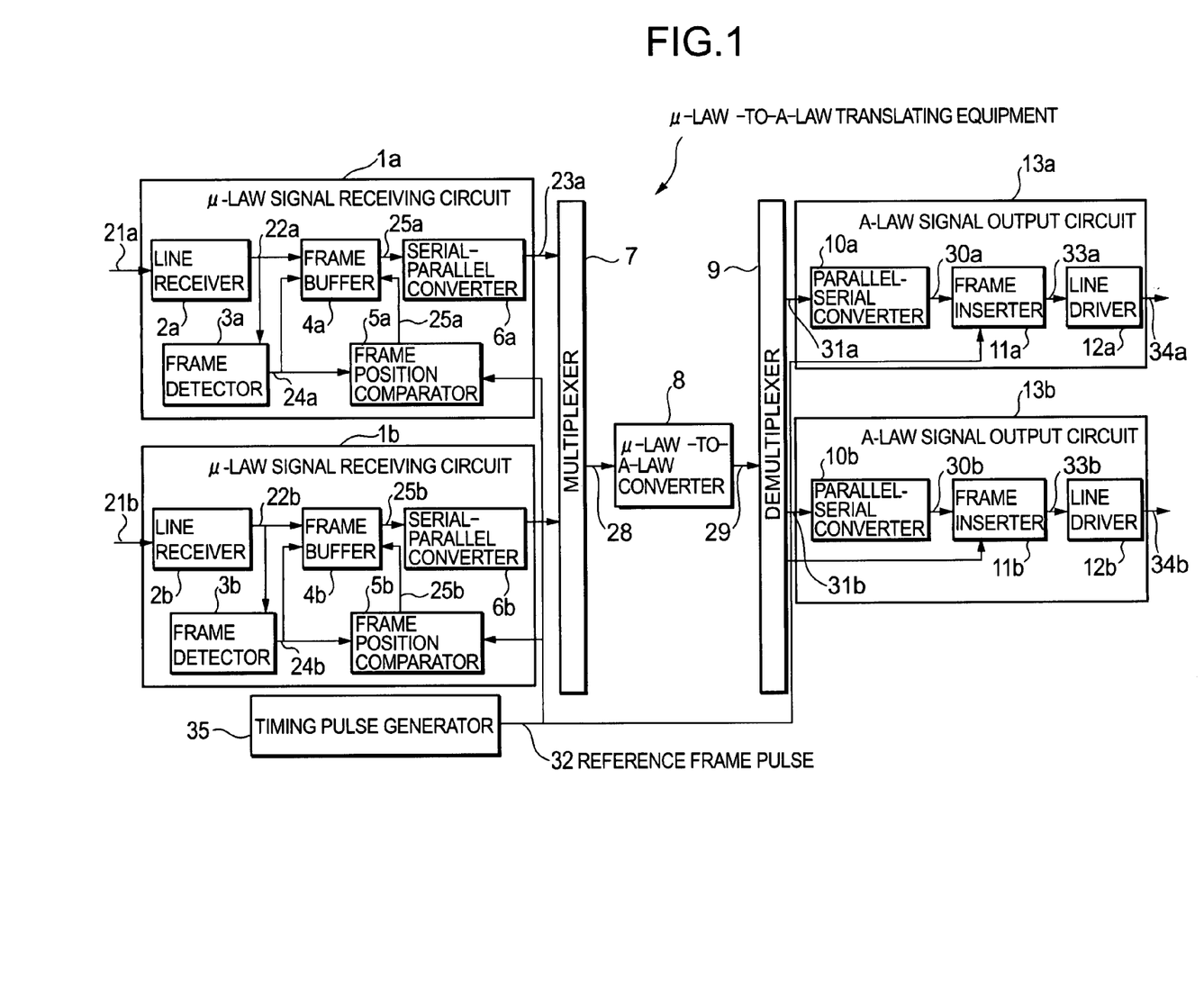
FIG. 1 is a block diagram showing μ-law-to-A-law translating equipment that contains two lines.

FIG. 1 shows μ-law-to-A-law translating equipment that contains two lines equivalent to a first embodiment of the invention. The μ-law-to-A-law translating equipment is provided with a multiplexer 7 before a μ-law-to-A-law converter 8 and a demultiplexer 9 after it. The μ-law-to-A-law translating equipment is also provided with two μ-law signal receiving circuits 1a and 1b before the multiplexer 7 and is provided with two A-law signal output circuits 13a and 13b after the demultiplexer 9. The μ-law signal receiving circuits 1a and 1b have the same configuration and the A-law signal output circuits 13a and 13b also have the same configuration. The μ-law-to-A-law translating equipment contains two primary PCM telephone lines, however, only one μ-law-to-A-law converter 8 is mounted in the equipment. The equipment is also provided with a timing pulse generator 35 that outputs a reference frame pulse 32 to the μ-law signal receiving circuits 1a and 1b and the A-law signal output circuits 13a and 13b. The μ-law signal receiving circuit 1a is provided with a line receiver 2a, a frame buffer 4a, a frame detector 3a, a frame position comparator 5a and a serial-parallel converter 6a. The line receiver 2a converts a μ-law primary PCM signal 21a input to the μ-law-to-A-law translating equipment from bipolar to unipolar and outputs a unipolar μ-law primary signal 22a. The frame buffer 4a is a memory for temporarily storing a unipolar μ-law primary signal 22a output from the line receiver 2a and is a first-in first-out (FIFO) memory having data capacity for two frames for example. The frame detector 3a detects the frame leading part of a unipolar μ-law primary signal 22a and outputs an address reset pulse 24a synchronized with the frame leading position for writing to the frame buffer to the frame buffer 4a and the frame position comparator 5a. The frame position comparator 5a compares the position of a reference frame pulse 32 output from the timing pulse generator 35 and an address reset pulse 24a for writing to the frame buffer and counts the time lag in a position of these pulses according to a clock signal inside the μ-law-to-A-law translating equipment not shown. This comparator 5a outputs an address reset pulse 25a for reading from the frame buffer to the frame buffer 4a based upon the result of the count. The serial-parallel converter 6a converts a serial μ-law PCM signal 27a in units of 8 bits read from the frame buffer 4a to 8-bit parallel signals and outputs parallel μ-law PCM signals 23a. The μ-law signal receiving circuit 1b is also provided with the same configuration and function as those of the μ-law signal receiving circuit 1a. The multiplexer 7 time-division multiplexes parallel μ-law PCM signals 23a and 23b respectively output from the serial-parallel converters 6a and 6b and outputs a time-division multiplexed μ-law PCM signal 28. The well-known μ-law-to-A-law converter 8 converts the time-division multiplexed μ-law PCM signal 28 to a time-division multiplexed A-law PCM signal 29. The demultiplexer 9 demultiplexes the time-division multiplexed A-law PCM signal 29 and outputs parallel A-law PCM signals 31a and 31b to the A-law signal output circuits 13a and 13b. The A-law signal output circuit 13a is provided with a parallel-serial converter 10a and a frame inserter 11a and further, can be also provided with a line driver 12a. The parallel-serial converter 10a converts the parallel A-law PCM signals 31a to a serial signal and outputs a serial A-law PCM signal 30a. The frame inserter 11a inserts frame bits required for the serial A-law PCM signal 30a based upon a reference frame pulse 32 output from the timing pulse generator 35. The line driver 12a adjusts a serial A-law PCM signal 33a so that it is at a predetermined output amplitude level and outputs an A-law primary PCM signal 34a. The A-law signal output circuit 13b is also provided with the same configuration and function as those of the A-law signal output circuit 13a.

Figure 2:
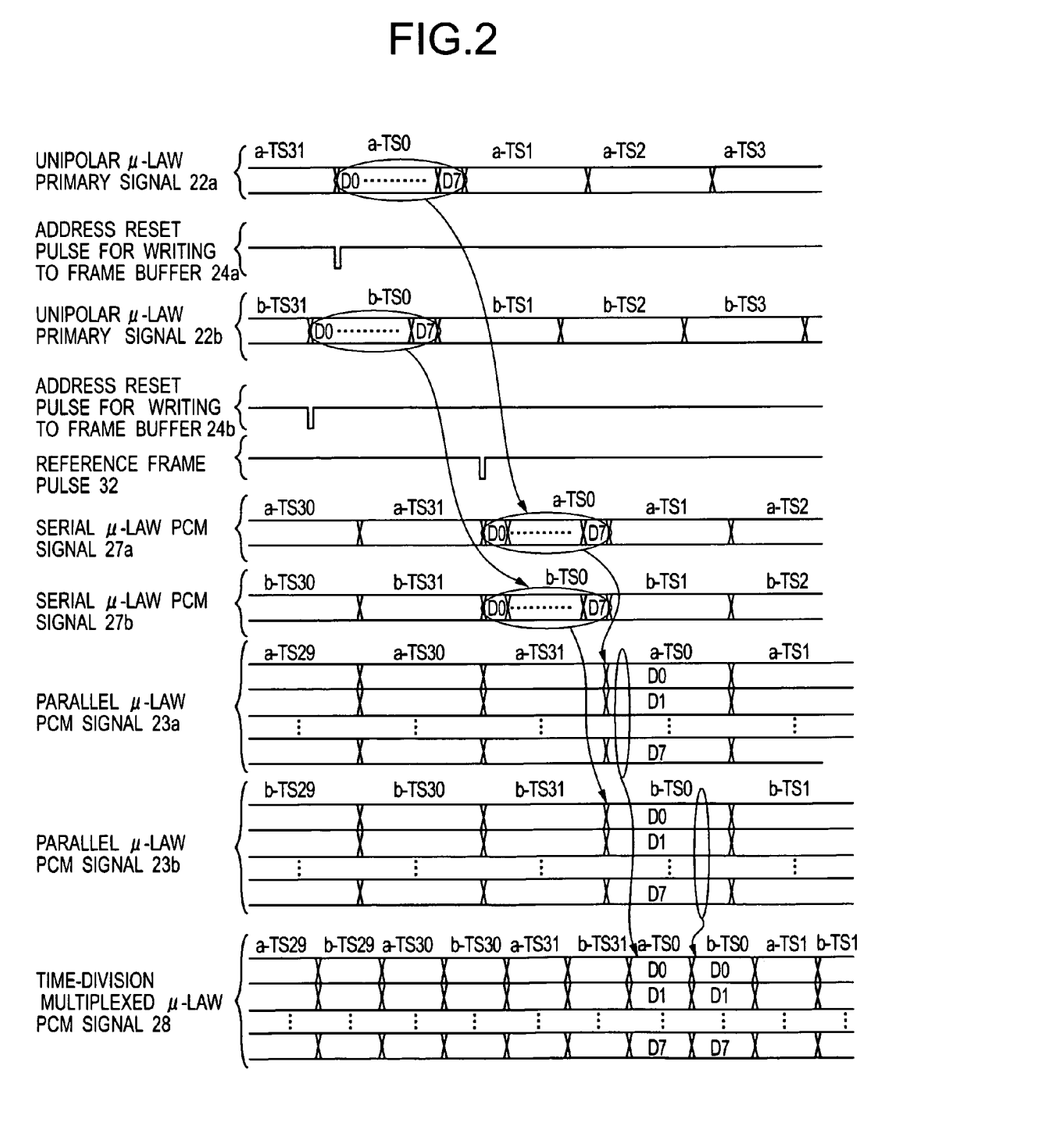
FIG. 2 is a timing chart showing each signal of the μ-law-to-A-law translating equipment that contains two lines.

Referring to FIG. 2, the operation of the μ-law-to-A-law translating equipment will be described below. The corresponding numbers in the two μ-law signal receiving circuits 1a and 1b will be both described below. The line receivers 2a and 2b respectively convert μ-law primary PCM signals 21a and 21b and respectively output unipolar μ-law primary signals 22a and 22b ((1) and (3) in FIG. 2). The frame detectors 3a and 3b detect the respective frame position of the μ-law primary PCM signals 21a and 21b. The frame detectors 3a and 3b also respectively generate address reset pulses 24a and 24b ((2) and (4) in FIG. 2) synchronized with the detected frame for writing to the frame buffer. These address reset pulses 24a and 24b are respectively output to the frame buffers 4a and 4b and the frame position comparators 5a and 5b. The frame position comparators 5a and 5b receive a reference frame pulse 32 ((5) in FIG. 2) which the timing pulse generator 35 outputs and measure time lag between the pulse 32 and the address reset pulses for writing to the frame buffer 24a and 24b. The frame position comparators 5a and 5b respectively output address reset pulses synchronized with a reference frame pulse 32 for reading from the frame buffer 25a and 25b to the frame buffers 4a and 4b so as to read a PCM signal stored in the frame buffers 4a and 4b. As a result, serial μ-law PCM signals 27a and 27b ((6) and (7) in FIG. 2) synchronized with a reference frame pulse 32 are respectively read from the frame buffers 4a and 4b. When a reference frame pulse 32 and an address reset pulse for writing to the frame buffer 24a are close or occur at the same timing, reading operation and writing operation from/to the same data area simultaneously occur in the frame buffer 4a and the normal reading and writing of data are disabled. In such a case, the frame position comparator 5a advances or slows an address reset pulse for reading from the frame buffer 25a by one frame to prevent simultaneous occurrence of both operation. Further, the serial-parallel converters 6a and 6b respectively convert serial μ-law PCM signals 27a and 27b which are a serial signal in units of 8 bits to parallel μ-law PCM signals 23a and 23b ((8) and (9) in FIG. 2). As a result, even if μ-law primary PCM signals 21a and 21b are not synchronous, parallel μ-law PCM signals 23a and 23b ((8) and (9) in FIG. 2) are synchronous with a reference frame pulse 32 ((5) in FIG. 2). The multiplexer 7 time-division multiplexes the parallel μ-law PCM signals 23a and 23b ((8) and (9) in FIG. 2) and outputs as a time-division multiplexed μ-law PCM signal 28 ((10) in FIG. 2).

The μ-law-to-A-law converter 8 successively converts the time-division multiplexed μ-law PCM signal 28 to the corresponding A-law bit pattern and outputs a time-division multiplexed A-law PCM signal 29. The demultiplexer 9 demultiplexes the signal 29 and outputs parallel A-law PCM signals 31a and 31b. The parallel-serial converters 10a and 10b respectively convert the parallel A-law PCM signals 31a and 31b to serial A-law PCM signals 30a and 30b. The frame inserters 11a and 11b respectively insert a frame bit according to the frame format of a primary line according to A-law into the serial A-law PCM signals 30a and 30b according to a reference frame pulse received from the timing pulse generator 35. The line drivers 12a and 12b respectively convert serial A-law PCM signals 33a and 33b to which the frame bit is added from unipolar to bipolar and respectively output A-law primary PCM signals 34a and 34b at a predetermined output level.

Figure 3:
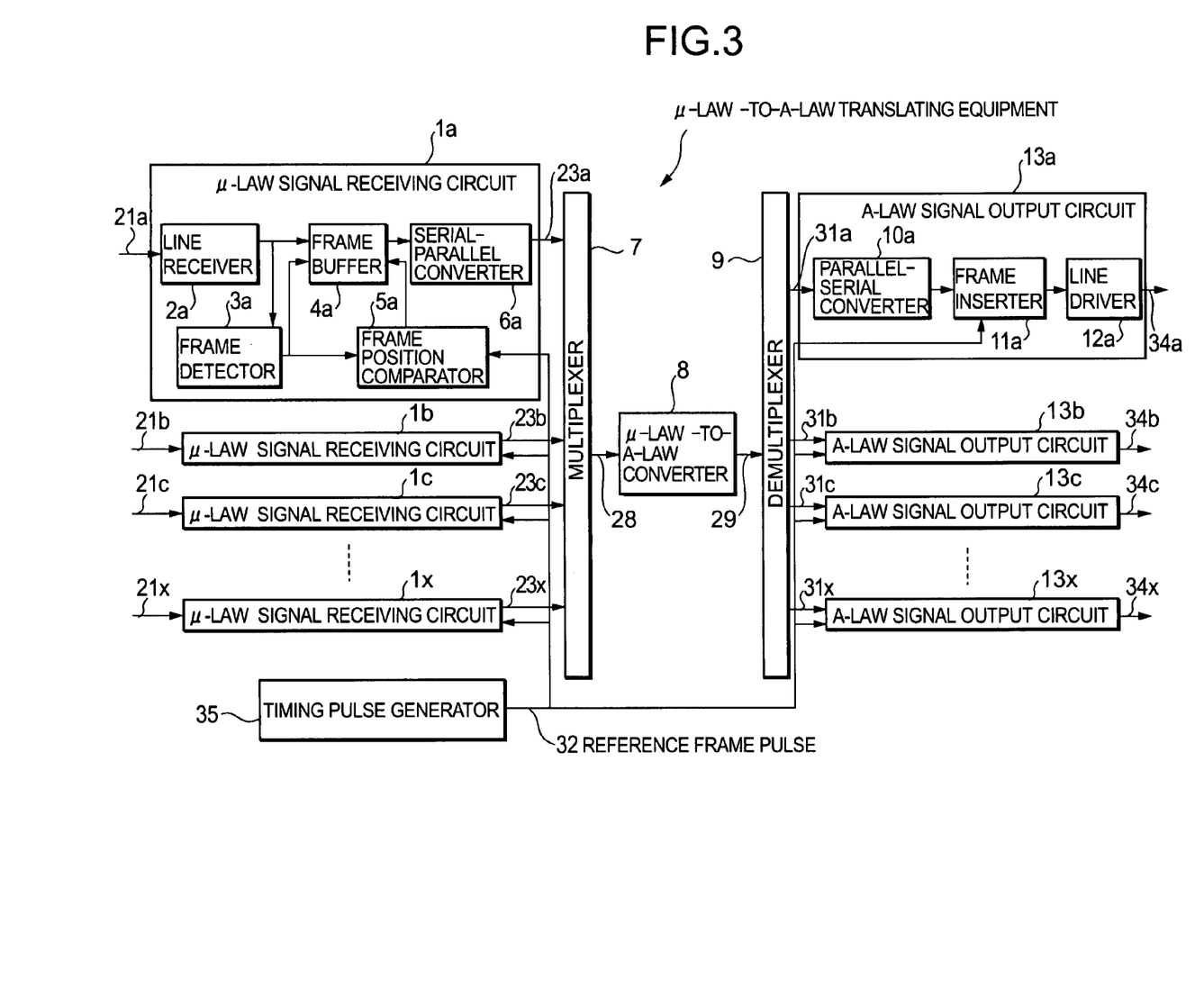
FIG. 3 is a block diagram showing μ-law-to-A-law translating equipment that contains three or more lines.

FIG. 3 shows an example of μ-law-to-A-law translating equipment that contains three or more lines. This equipment is provided with three or more μ-law signal receiving circuits 1a to 1x, a multiplexer 7, a μ-law-to-A-law converter 8, a demultiplexer 9, A-law signal output circuits 13a to 13x of the same number as that of the μ-law signal receiving circuits and a timing pulse generator 35. Each μ-law signal receiving circuit 1a to 1x has the same configuration and each A-law signal output circuit 13a to 13x also has the same configuration. The multiplexer 7 time-division multiplexes parallel μ-law PCM signals 23a to 23x output by each μ-law signal receiving circuit 1a to 1× and outputs a time-division multiplexed μ-law PCM signal 28. The μ-law-to-A-law converter 8 converts the μ-law PCM signal 28 to an A-law bit pattern and outputs a time-division multiplexed A-law PCM signal 29. The demultiplexer 9 demultiplexes the signal 29 and outputs parallel A-law PCM signals 31a to 31× to the A-law signal output circuits 13a to 13x. The A-law signal output circuits 13a to 13x respectively output A-law primary PCM signals 34a to 34x.

Figure 4:
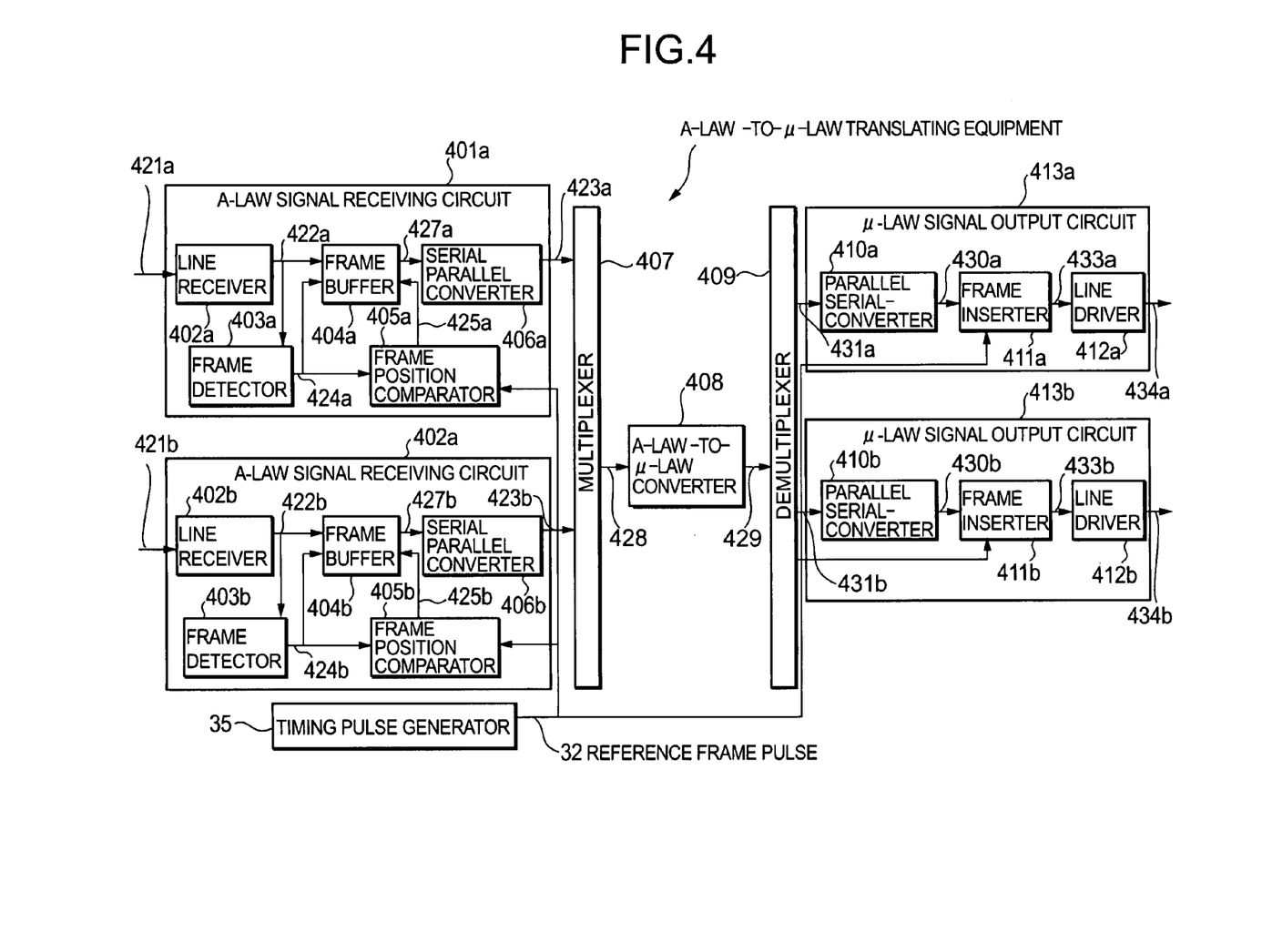
FIG. 4 is a block diagram showing A-law-to-μ-law translating equipment that contains two lines.

FIG. 4 shows an example of A-law-to-μ-law translating equipment that contains two lines. This A-law-to-μ-law translating equipment is provided with A-law signal receiving circuits 401a and 401b, a multiplexer 407, an A-law-to-μ-law converter 408, a demultiplexer 409, μ-law signal output circuits 413a and 413b and a timing pulse generator 35. The A-law-to-μ-law translating equipment is similar to the μ-law-to-A-law translating equipment in configuration and a function, however, they are different in a signal processed by them. A-law primary PCM signals 421a and 421b are respectively input to the A-law signal receiving circuits 401a and 401b, are respectively converted to parallel A-law PCM signals 423a and 423b respectively synchronized with a reference frame pulse 32 and are output to the multiplexer 407. The multiplexer 407 time-division multiplexes the parallel A-law PCM signals 423a and 423b. The A-law-to-μ-law converter 408 converts the signals 423a and 423b to a time-division multiplexed μ-law PCM signal 429. The demultiplexer 409 demultiplexes the signal 429 and respectively outputs parallel μ-law PCM signals 431a and 431b to the μ-law signal output circuits 413a and 413b. In the μ-law signal output circuits 413a and 413b, the signals 431a and 431b are converted to serial μ-law PCM signals 430a and 430b, a frame bit according to the frame format of the primary line according to μ-law is inserted by the frame inserters 411a and 411b and the signals are output as μ-law primary PCM signals 434a and 434b at a predetermined output level.

Figure 5:
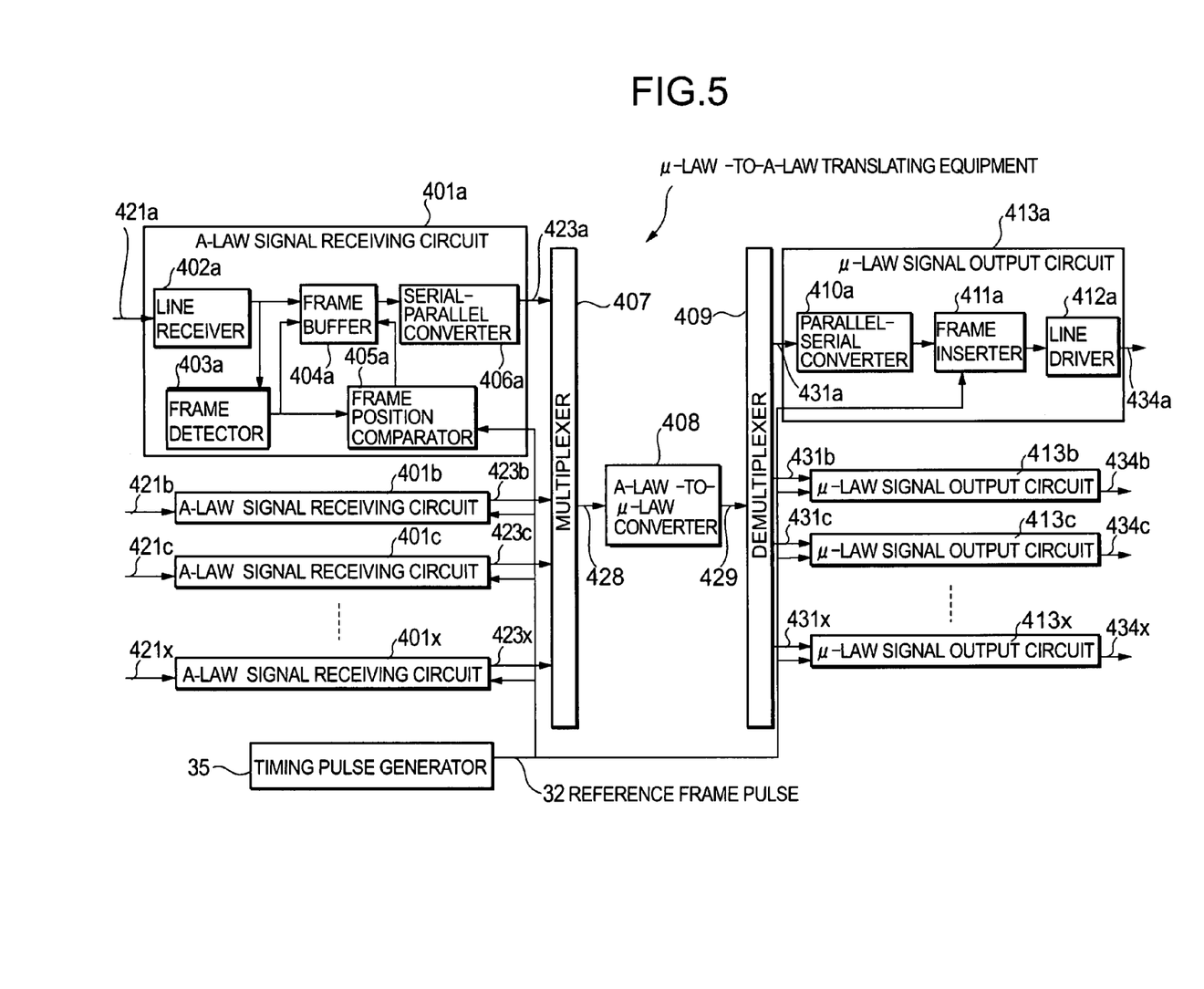
FIG. 5 is a block diagram showing A-law-to-μ-law translating equipment that contains three or more lines.

FIG. 5 shows an example of A-law-to-μ-law translating equipment that contains three or more lines. This equipment is provided with three or more A-law signal receiving circuits 401a to 401x, a multiplexer 407, a A-law-to-μ-law converter 408, a demultiplexer 409, μ-law signal output circuits 413a to 413x of the same number as that of the A-law signal receiving circuits and a timing pulse generator 35. Each A-law signal receiving circuit has the same configuration as the above-mentioned μ-law signal receiving circuit though processed signals are different. Each μ-law signal output circuit is also similar. The multiplexer 407 time-division multiplexes parallel μ-law PCM signals 423a to 423x output by each A-law signal receiving circuit 401a to 401× and outputs a time-division multiplexed A-law PCM signal 428. The A-law-to-μ-law converter 408 converts the A-law PCM signal 428 to a μ-law bit pattern and outputs a time-division multiplexed μ-law PCM signal 429. The demultiplexer 409 demultiplexes the signal 429 and outputs parallel I-law PCM signals 431a to 431x to the μ-law signal output circuits 413a to 413x. The μ-law signal output circuits 413a to 413x respectively output μ-law primary PCM signals 434a to 434x.

Figure 6:
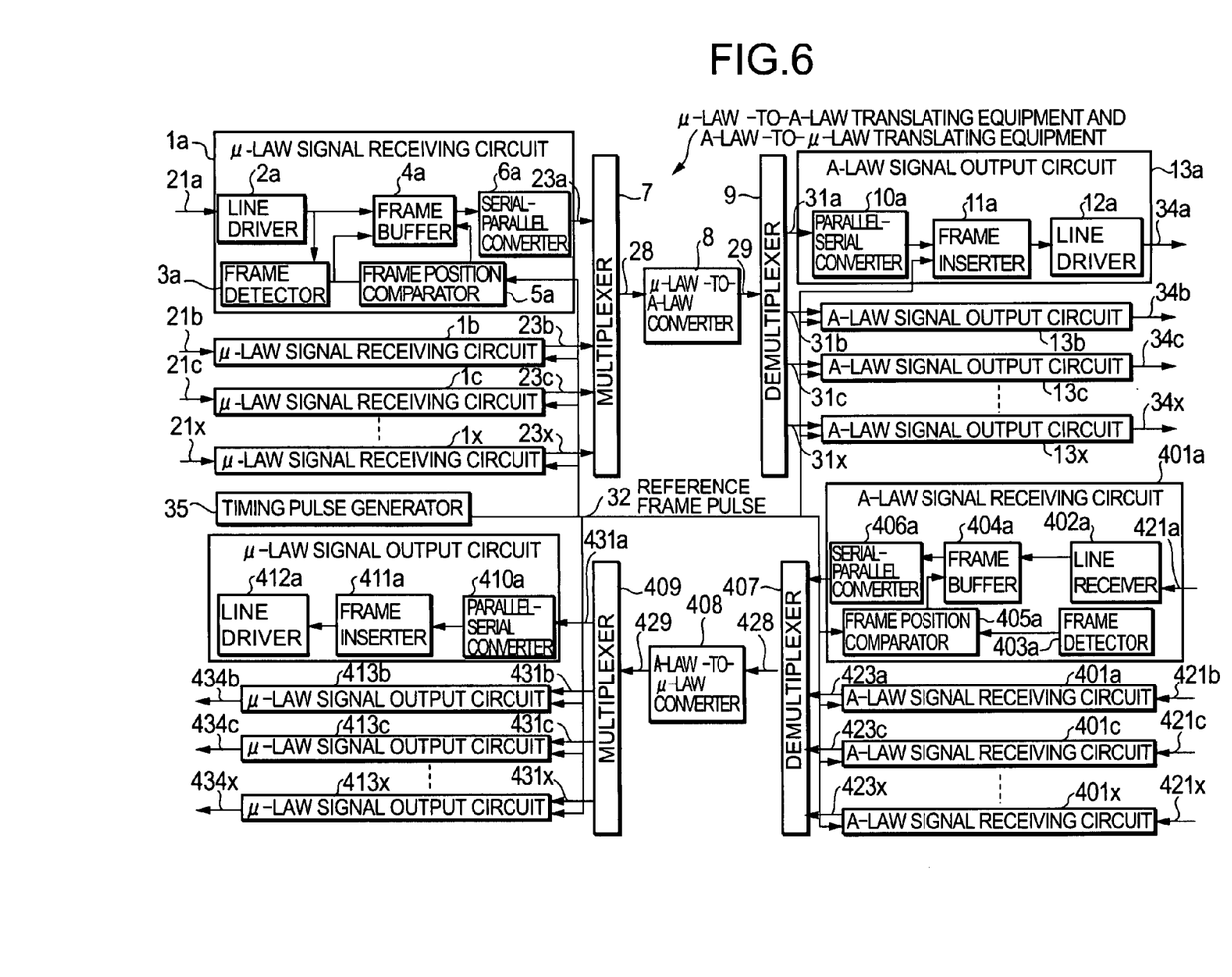
FIG. 6 is a block diagram showing μ-law-to-A-law translating equipment and A-law-to-μ-law translating equipment.

FIG. 6 shows an example of μ-law-to-A-law and A-law-to-μ-law translating equipment. This equipment is provided with the μ-law-to-A-law translating equipment that contains three or more lines shown in FIG. 3 and the A-law-to-μ-law translating equipment that contains three or more lines shown in FIG. 5. This equipment can execute the mutual conversion of μ-law and A-law. The equipment shown in FIG. 6 receives μ-law primary PCM signals 21a to 21x, outputs A-law primary PCM signals 34a to 34x, similarly receives A-law primary PCM signals 421a to 421× and outputs μ-law primary PCM signals 434a to 434x.

The translating equipment according to the invention locks the phase of input plural signals in units of octet composed of 8 bits inside the equipment and converts to 8-bit parallel data. As a result, the equipment can time-division multiplex input data from two lines and can execute μ-law-to-A-law conversion (or A-law-to-μ-law conversion) using only one μ-law-to-A-law converter (or only one A-law-to-μ-law converter) for the parallel input-output of 8 bits. Therefore, this equipment can have simple circuit configuration and the reliability is enhanced at a low cost.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. μ-law-to-A-law translating equipment, comprising:
   a timing pulse generator that generates a reference frame pulse;
   a μ-law signal receiving circuit that receives a μ-law PCM signal and outputs parallel μ-law PCM signals according to a reference frame pulse, said μ-law signal receiving circuit comprising:
      a line receiver that converts the μ-law PCM signal from bipolar to unipolar and outputs a unipolar μ-law signal,
      a frame buffer that temporarily stores the unipolar μ-law signal,
      a frame detector that detects the frame leading part of the unipolar μ-law signal and generates an address reset pulse synchronized with the frame leading position for writing to the frame buffer,
      a frame position comparator that measures the time lag in a position of a reference frame pulse and the address reset pulse for writing to the frame buffer and generates an address reset pulse for reading from the frame buffer, and
      a serial-parallel converter that converts and outputs a serial μ-law PCM signal read from the frame buffer to parallel μ-law PCM signals;
   a multiplexer that time-division multiplexes plural parallel μ-law PCM signals and outputs a time-division multiplexed μ-law PCM signal;
   a μ-law-to-A-law converter that converts the time-division multiplexed μ-law PCM signal to a time-division multiplexed A-law PCM signal;
   a demultiplexer that demultiplexes the time-division multiplexed A-law PCM signal and outputs plural parallel A-law PCM signals; and
   an A-law signal output circuit that receives the parallel A-law PCM signals and outputs a serial A-law PCM signal.

2. μ-law-to-A-law translating equipment according to claim 1, comprising:
   respective plural and the same number of μ-law signal receiving circuits and A-law signal output circuits.

3. μ-law-to-A-law translating equipment according to claim 1, wherein:
   the A-law signal output circuit comprises:
      a parallel-serial converter that converts parallel A-law PCM signals to a serial A-law PCM signal; and
      a frame inserter that inserts a frame bit into the serial A-law PCM signal.

4. μ-law-to-A-law translating equipment according to claim 3, wherein:
the frame inserter inserts a frame bit according to a reference frame pulse.

5. μ-law-to-A-law translating equipment according to claim 3, wherein:
the A-law signal output circuit further comprises:
a line driver that outputs a serial A-law PCM signal at a predetermined output amplitude level.

6. A-law-to-μ-law translating equipment, comprising:
a timing pulse generator that generates a reference frame pulse;
an A-law signal receiving circuit that receives an A-law PCM signal and outputs parallel A-law PCM signals according to a reference frame pulse, said A-law receiving circuit comprises:
  a line receiver that converts an A-law PCM signal from bipolar to unipolar and outputs a unipolar A-law signal,
  a frame buffer that temporarily stores the unipolar A-law signal,
  a frame detector that detects the frame leading part of the unipolar A-law signal and generates an address reset pulse synchronized with the frame leading position for writing to the frame buffer,
  a frame position comparator that measures the time lag in a position of a reference frame pulse and the address reset pulse for writing to the frame buffer and generates an address reset pulse for reading from the frame buffer, and
  a serial-parallel converter that converts a serial A-law PCM signal read from the frame buffer to parallel A-law PCM signals;
a multiplexer that time-division multiplexes plural parallel A-law PCM signals and outputs a time-division multiplexed A-law PCM signal;
an A-law-to-μ-law converter that converts the time-division multiplexed A-law PCM signal to a time-division multiplexed μ-law PCM signal;
a demultiplexer that demultiplexes the time-division multiplexed μ-law PCM signal and outputs plural parallel μ-law PCM signals; and
a μ-law signal output circuit that receives parallel μ-law PCM signals and outputs a serial μ-law PCM signal.

7. A-law-to-μ-law translating equipment according to claim 6, comprising:
respective plural and the same number of A-law signal receiving circuits and μ-law signal output circuits.

8. A-law-to-μ-law translating equipment according to claim 6, wherein:
the μ-law signal output circuit comprises:
a parallel-serial converter that converts parallel μ-law PCM signals to a serial μ-law PCM signal; and
a frame inserter that inserts a frame bit into the serial μ-law PCM signal.

9. A-law-to-μ-law translating equipment according to claim 8, wherein:
the frame inserter adds a frame bit to the serial μ-law PCM signal according to a reference frame pulse.

10. A-law-to-μ-law translating equipment according to claim 8, wherein:
the μ-law signal output circuit further comprises:
a line driver that outputs a serial μ-law PCM signal at a predetermined output amplitude level.

\* \* \* \* \*